United States Patent Office 3,003,834
Patented Oct. 10, 1961

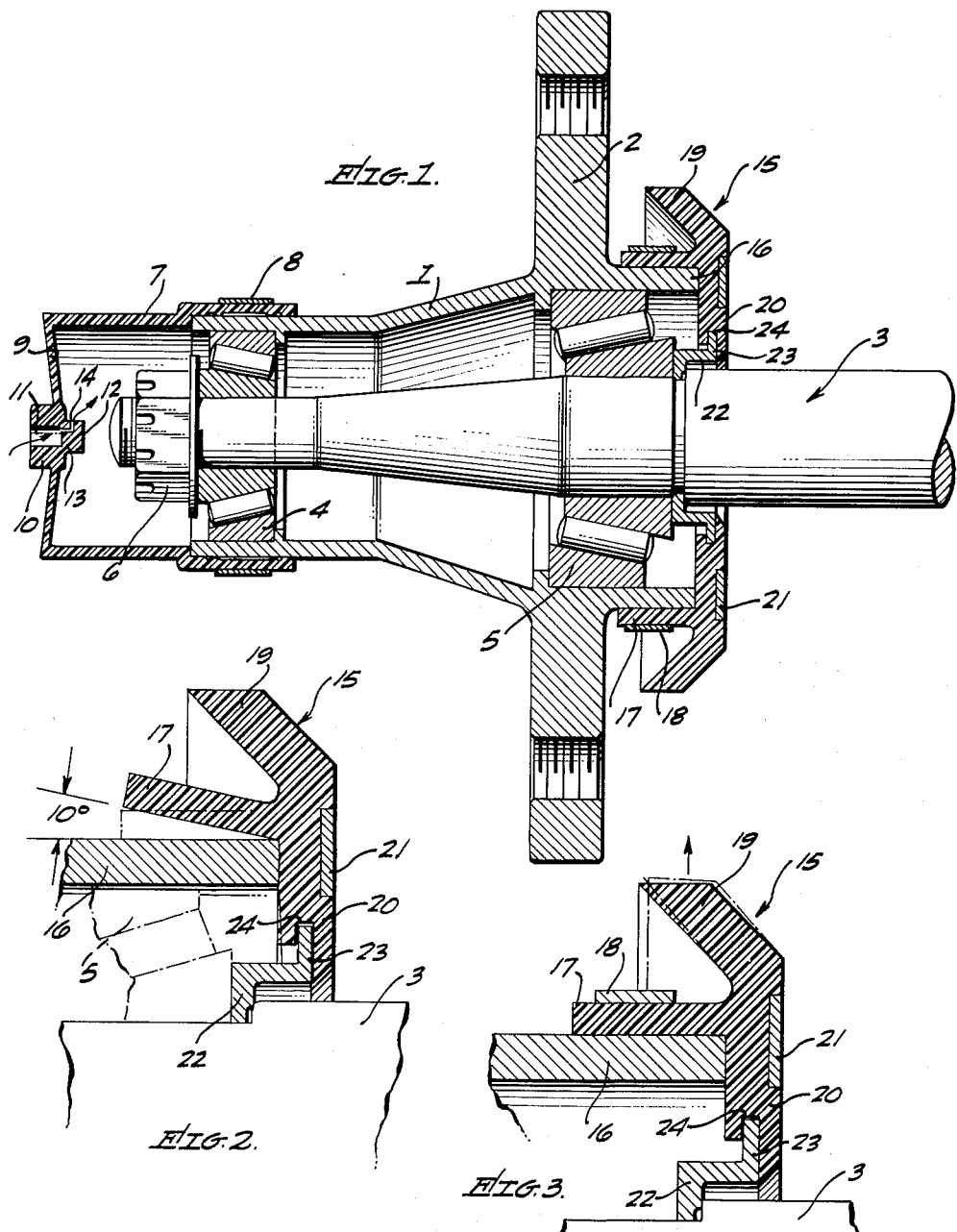

3,003,834
SEAL FOR VEHICLE HUBS
Alfred H. Pendleton, 902 W. Hadley St., Whittier, Calif.
Filed May 12, 1960, Ser. No. 28,706
5 Claims. (Cl. 308—187.1)

This invention relates to a seal for vehicle hubs to prevent lubrication from being forced out of the hub, and also to prevent the ingress of water when the trailer or the like is submerged for the purpose of unloading or loading a boat.

An object of my invention is to provide a more effective means of retaining a lubricant in the hub of a vehicle wheel, and also to protect the wheel hub against the seepage of water therein in event that the wheel is submerged, as when a boat is loaded or unloaded.

Still another object of my invention is to provide a novel rear seal for the vehicle hub which will relieve frictional pressure of the seal when the vehicle is moving at usual road speeds, but which will effectively seal the hub against the intrusion of water or the like when the vehicle is standing still.

Still another object of my invention is to provide a novel cap for the hub of the vehicle which is provided with an air valve through which air under pressure can be forced to maintain the hub under air pressure above atmospheric, thus further preventing the intrusion of water or the like, especially if the hub is used on a trailer.

Still another object of my invention is to provide a novel seal for vehicle hubs which can be easily mounted on a conventional hub and axle or spindle, and which is also simple in construction and inexpensive to manufacture and effective in use.

Other objects, advantages and features of invention may appear from the accompanying drawing, the subjoined detailed description and the appended claims.

In the drawing:

FIGURE 1 is a vertical sectional view through a conventional wheel hub and upon which my seal is mounted.

FIGURE 2 is a fragmentary vertical sectional view of the rear seal in one position of the parts.

FIGURE 3 is a view similar to FIGURE 2 and showing the parts in another position.

Referring more particularly to the drawing, conventional parts of a wheel mounting are illustrated and these consist of the wheel hub 1, the flange 2 of the hub, and the axle or spindle 3 upon which the hub is mounted. A front bearing 4 is positioned between the spindle 3 and the hub 1, and a second or rear bearing 5 is also mounted between the hub and the spindle 3. These bearings are here shown as roller bearings, although other types might be employed. A nut 6 is screwed onto the outer end of the spindle 3 to hold the hub and the bearings 4—5 in position. To properly lubricate the bearings 4—5 the hub 1 is packed with a suitable oil or grease and it is desirable to prevent water, dust, and the like from entering the hub and interfering with the proper functioning of the bearings 4—5. To effectively exclude foreign material from the hub 1, two elements are required, one a means of maintaining air pressure within the hub 1 above atmospheric and, secondly, an effective rear seal to prevent leakage of oil or grease from the hub.

To provide a means of both sealing the outer end of the hub 1 and to permit the hub to be maintained under air pressure, I provide a cap 7 which is attached to the outer end of the hub 1 by means of a metal band or ring 8. The cap 7 is preferably made of rubber or plastic and includes a transverse outer wall 9 which is relatively thin and flexible. A nubbin 10 is integrally formed on the wall 9 and is provided with a central intake passage 11. A small flexible button 12, integrally formed with the nubbin 10, acts as a valve when there is pressure on the inside of the hub 1. An annular groove 13 is cut in the base of the button 12, and this groove extends to an arcuate port 14 which opens into the cap 7 and permits air to be forced into this cap from a suitable supply of air pressure. Pressure can be supplied by a small air syringe or the like (not shown) which is inserted in the port 11, and which will inflate the cap 7 and maintain the inside of the hub 1 under air pressure somewhat above atmospheric. The cap 7 is sealed against leakage by the mounting ring 8, and the button 12 will seal or close the port 14 as soon as air under pressure from an external source is no longer flowing therethrough. The cap 7 will now bulge slightly, due to air pressure on the inside, and this will indicate to the user that the hub is under a slight internal pressure. Water cannot enter the cap 7 because the button 12 seals the air ports 13 and 14, and also because there is air pressure within the hub.

To prevent leakage of oil or grease from the inside of the hub 1, I provide a rear seal 15 of the following construction:

An inwardly projecting horizontal flange 16 is formed on the hub 1 and my rear seal 15 is attached thereto. The rear seal 15 consists of a substantially T-shaped structure consisting of a mounting ring 17 which is held onto the part 16 by the band 18. The band 18 is the usual metal clamp which is frequently used to hold one part to another. A centrifugal control finger 19 is integrally formed with the ring 17 and is annular in shape. Extending inwardly from the ring 17 I provide a valve annulus 20. A metal stiffener 21, also annular in shape, is embedded in the lower part of the centrifugally actuated finger 19 for the purpose of stiffening the valve annulus 20 and causing this annulus to move inwardly and outwardly as a unit. This will be further described. A sealing cup 22 is mounted on the spindle 3 rearwardly of the bearing 5. The sealing cup includes a vertically extending flange 23 at its innermost end, which extends into an annular groove 24 formed in the valve annulus 20. The groove 24 is somewhat wider than the coacting flange 23 and, consequently, the valve annulus 20 can move horizontally to either press tightly against a face of the part 23, or tension against this face can be relieved by the centrifugal force acting on the finger 19 when the vehicle is moving. When the inner seal 15 is constructed the ring 17 is positioned at an angle shown in FIG. 2. When the mount 18 is applied the part 17 will be pressed against the annular flange 16, as shown in FIG. 3. This creates a tension on the depending valve annulus 20 and causes the groove 24 to fit tightly against one face of the part 23. This seals the hub 1 at the rear. When the vehicle is moving on the road the finger 19 will be acted upon by centrifugal force, tending to swing it outwardly, as shown in dotted lines in FIG. 3, and this will relieve the pressure of the groove 24 against the corresponding engaging face of the part 23. This will relieve friction and permit the wheel to rotate easily on the spindle. The reinforcing member 21 will cause the valve annulus to move horizontally as the finger 19 is acted upon by centrifugal force. When the wheel is stationary the natural tension of the material of which the inner seal is made, namely, rubber or plastic, will create a lever action on the valve annulus 20, causing it to be pressed tightly against the part 23 to seal against this cup. Even when the vehicle is moving at road speeds the valve annulus 20 will not entirely leave the coacting sealing surface of the cup 23, but will still maintain a sufficient contact to prevent escape of air and also prevent the lubricating grease or oil from being forced out of the hub.

When the wheel might be inundated there is still relatively little water pressure tending to urge water into the hub and, consequently, a very small amount of air pressure within the hub will exclude any water.

Having described my invention, I claim:

1. A hub for wheels, comprising: a hollow tubular hub surrounding an axle spindle, bearings in said hub riding on said spindle, a sealing ring sealing the inner extremity of said hub to said spindle, a hub cap inclosing the outer extremity of said hub about said spindle, said hub cap being formed of a flexible nonmetallic material, a ring encircling the hub cap and the hub to detachably secure said hub cap to the hub, and an air valve means in said hub cap to admit air under pressure to said hub cap and hub.

2. A hub for wheels, comprising: a hollow tubular hub surrounding an axle spindle, bearings in said hub riding on said spindle, a sealing ring sealing the inner extremity of said hub to said spindle, said sealing ring being formed of a flexible nonmetallic material, means detachably securing said sealing ring to the hub, an annular finger projecting outwardly on said sealing ring, a valve annulus projecting inwardly on said sealing ring, means on the spindle engageable by the valve annulus to seal the hub to said spindle, a hub cap inclosing the outer extremity of said hub about said spindle, means detachably securing said hub cap to said hub, and an air valve means in said hub cap to admit air under pressure to said hub cap and hub.

3. A hub for wheels, comprising: a hollow tubular hub surrounding an axle spindle, bearings in said hub riding on said spindle, a sealing ring sealing the inner extremity of said hub to said spindle, said sealing ring being formed of a flexible nonmetallic material, means detachably securing said sealing ring to the hub, an annular finger projecting outwardly on said sealing ring, a valve annulus projecting inwardly on said sealing ring, means on the spindle engageable by the valve annulus to seal the hub to said spindle, a hub cap inclosing the outer extremity of said hub about said spindle, said hub cap being formed of a flexible nonmetallic material, a ring encircling the hub cap and the hub to detachably secure said hub cap to the hub, and an air valve means in said hub cap to admit air under pressure to said hub cap and hub.

4. A hub for wheels, comprising: a hollow tubular hub surrounding an axle spindle, bearings in said hub riding on said spindle, a sealing ring sealing the inner extremity of said hub to said spindle, said sealing ring being formed of a flexible nonmetallic material, a mounting ring on the sealing ring, means securing the mounting ring to the hub, an annular finger projecting outwardly on said sealing ring, a valve annulus projecting inwardly on said sealing ring, a sealing cup on the spindle, said valve annulus engaging the sealing ring to seal the hub to said spindle, a hub cap inclosing the outer extremity of said hub about said spindle, means detachably securing said hub cap to said hub, and an air valve means in said hub cap to admit air under pressure to said hub cap and hub.

5. A hub for wheels, comprising: a hollow tubular hub surrounding an axle spindle, bearings in said hub riding on said spindle, a sealing ring sealing the inner extremity of said hub to said spindle, said sealing ring being formed of a flexible nonmetallic material, a mounting ring on the sealing ring, means securing the mounting ring to the hub, an annular finger projecting outwardly on said sealing ring, a valve annulus projecting inwardly on said sealing ring, a sealing cup on the spindle, said valve annulus engaging the sealing ring to seal the hub to said spindle, a hub cap inclosing the outer extremity of said hub about said spindle, said hub cap being formed of a flexible nonmetallic material, a ring encircling the hub cap and the hub to detachably secure said hub cap to the hub, and an air valve means in said hub cap to admit air under pressure to said hub cap and hub.

References Cited in the file of this patent

UNITED STATES PATENTS

| | | |
|---|---|---|
| 2,657,104 | Kayser | Oct. 27, 1953 |
| 2,666,676 | Rhine | Jan. 19, 1954 |